Figure 1:
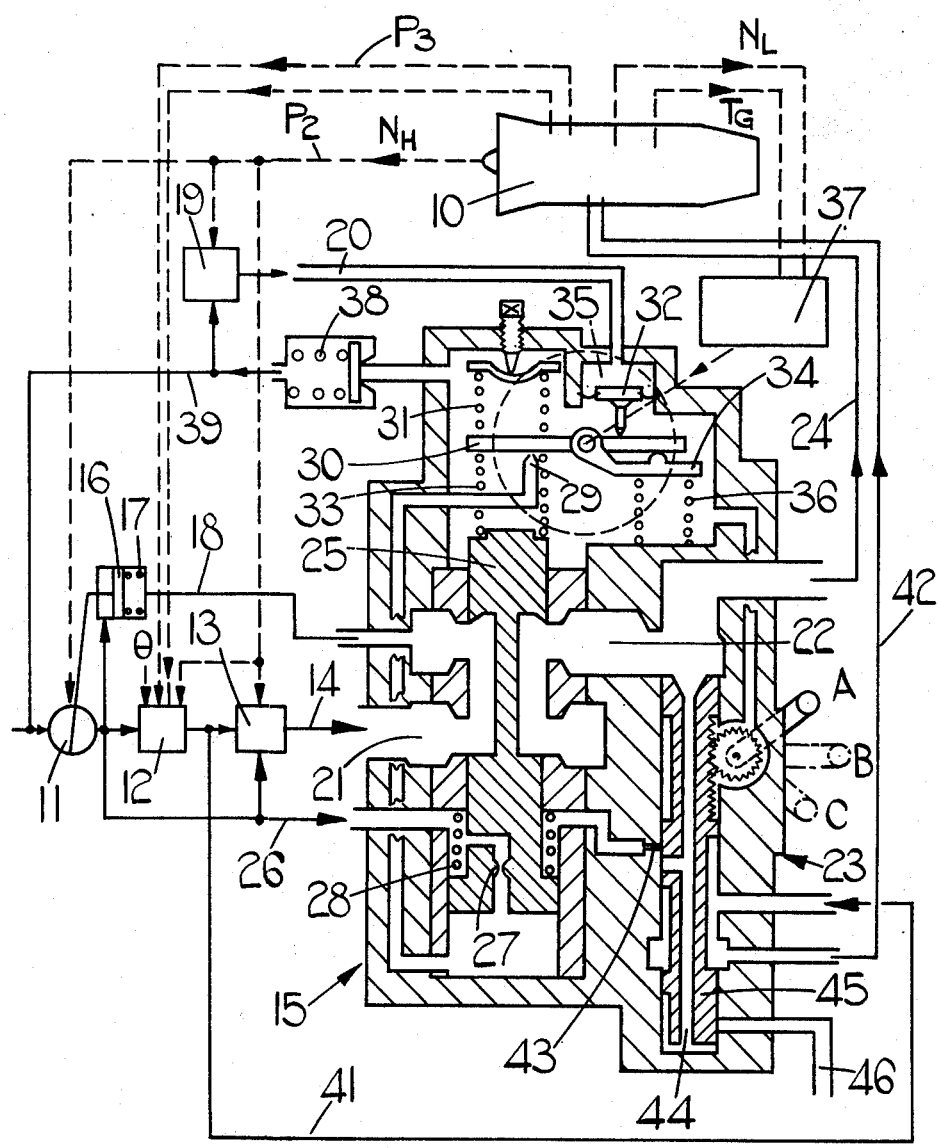

United States Patent [19]

Smith

[11] 3,958,414

[45] May 25, 1976

[54] CONTROL VALVE ARRANGEMENT FOR GAS TURBINE ENGINE FUEL SUPPLY SYSTEM

[75] Inventor: Trevor Stanley Smith, Sutton Coldfield, England

[73] Assignee: Joseph Lucas (Industries) Limited, Birmingham, England

[22] Filed: Nov. 6, 1974

[21] Appl. No.: 521,207

[30] Foreign Application Priority Data
Nov. 15, 1973 United Kingdom............... 53029/73
Jan. 26, 1974 United Kingdom................. 3748/74

[52] U.S. Cl............................................ 60/39.28 R
[51] Int. Cl.².......................................... F02C 9/08
[58] Field of Search....................... 60/39.28 R, 243

[56] References Cited
UNITED STATES PATENTS

| | | | |
|---|---|---|---|
| 3,173,468 | 3/1965 | McCombs | 60/39.28 R |
| 3,444,688 | 5/1969 | Warne | 60/39.28 R |
| 3,557,552 | 1/1971 | Yates | 60/39.28 R |
| 3,808,797 | 5/1974 | Robinson | 60/39.28 R |
| 3,808,801 | 5/1974 | Taylor | 60/39.28 R |
| 3,857,241 | 12/1974 | Lewis | 60/39.28 R |

Primary Examiner—Clarence R. Gordon

[57] ABSTRACT

A control valve for a gas turbine engine fuel control system has a control member responsive to a servo signal. The servo signal is derived from a pilot valve which is movable against a biasing spring in response to a pressure signal dependent on engine speed, the arrangement being such that an increase in engine speed causes the pilot valve to vary the servo signal so as to reduce fuel flow to the engine. The bias applied by the spring is variable by means of an electrical actuator responsive to other engine operating parameters.

15 Claims, 3 Drawing Figures

CONTROL VALVE ARRANGEMENT FOR GAS TURBINE ENGINE FUEL SUPPLY SYSTEM

This invention relates to a control valve arrangement, particularly for use in a fuel supply system for a gas turbine engine.

According to the invention there is provided a control valve arrangement for use in a gas turbine engine fuel supply system having a pump, a variable metering arrangement downstream of said pump and a device responsive to the speed of a turbine shaft of the engine to generate a first servo pressure signal dependent on said shaft speed, said valve arrangement comprising an inlet communicating with said metering arrangement, an outlet through which fuel can flow to said engine, a control element movable in response to an increase in a second servo pressure signal to permit an increased flow through said outlet, a pilot valve having a control member responsive to an increase in said first servo pressure signal to decrease said second servo pressure signal, and means responsive to an increase in an engine operating parameter to cause said pilot valve control member to reduce said second servo pressure signal.

In a preferred embodiment of the invention the means responsive to the engine operating parameter comprises a circuit responsive to said parameter to generate an electrical control signal and an actuator responsive to said electrical control signal to operate said pilot valve control member.

In a further preferred embodiment said actuator comprises a torque motor.

In another preferred embodiment said parameter responsive means is arranged to be responsive to the speed of a further turbine shaft of the engine.

Yet another preferred embodiment includes means coacting with said closure element and said pilot valve closure member such that movement of said closure member in response to an increase in said second servo pressure signal urges said closure member in a direction to decrease said second servo pressure signal.

Figure 2:
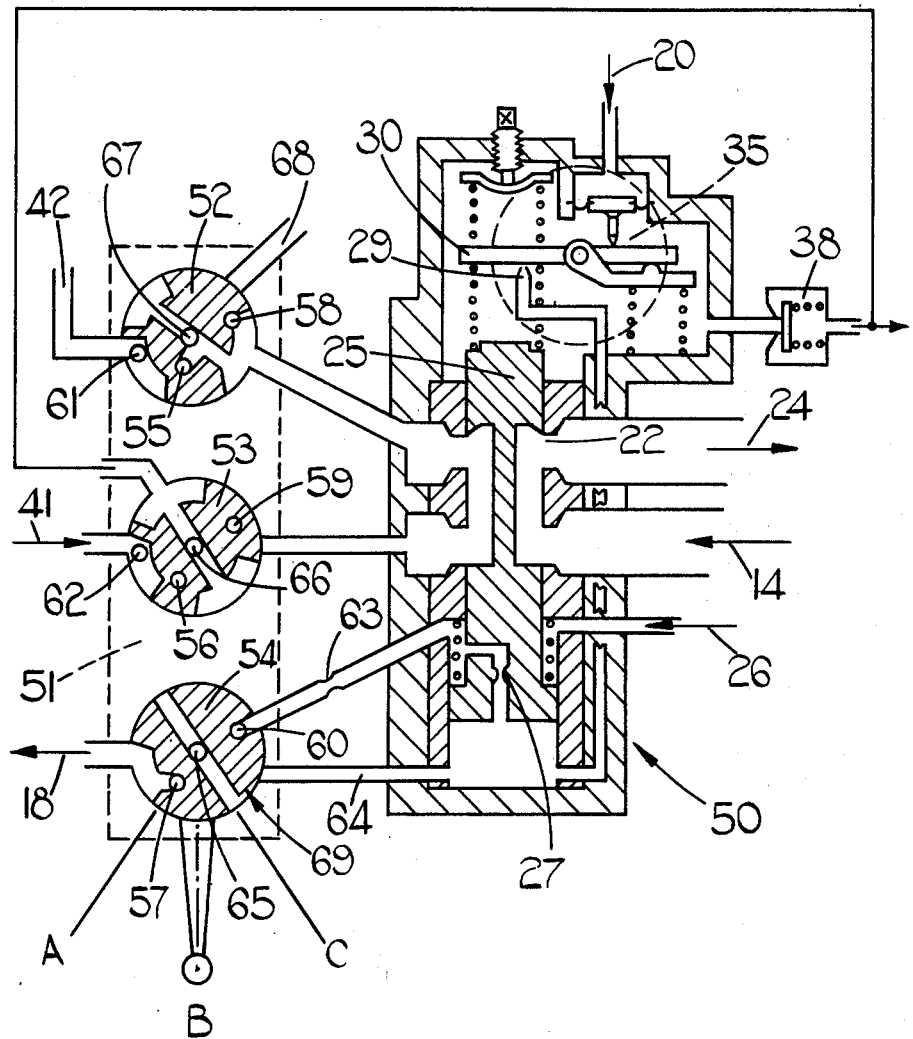
Figure 3:
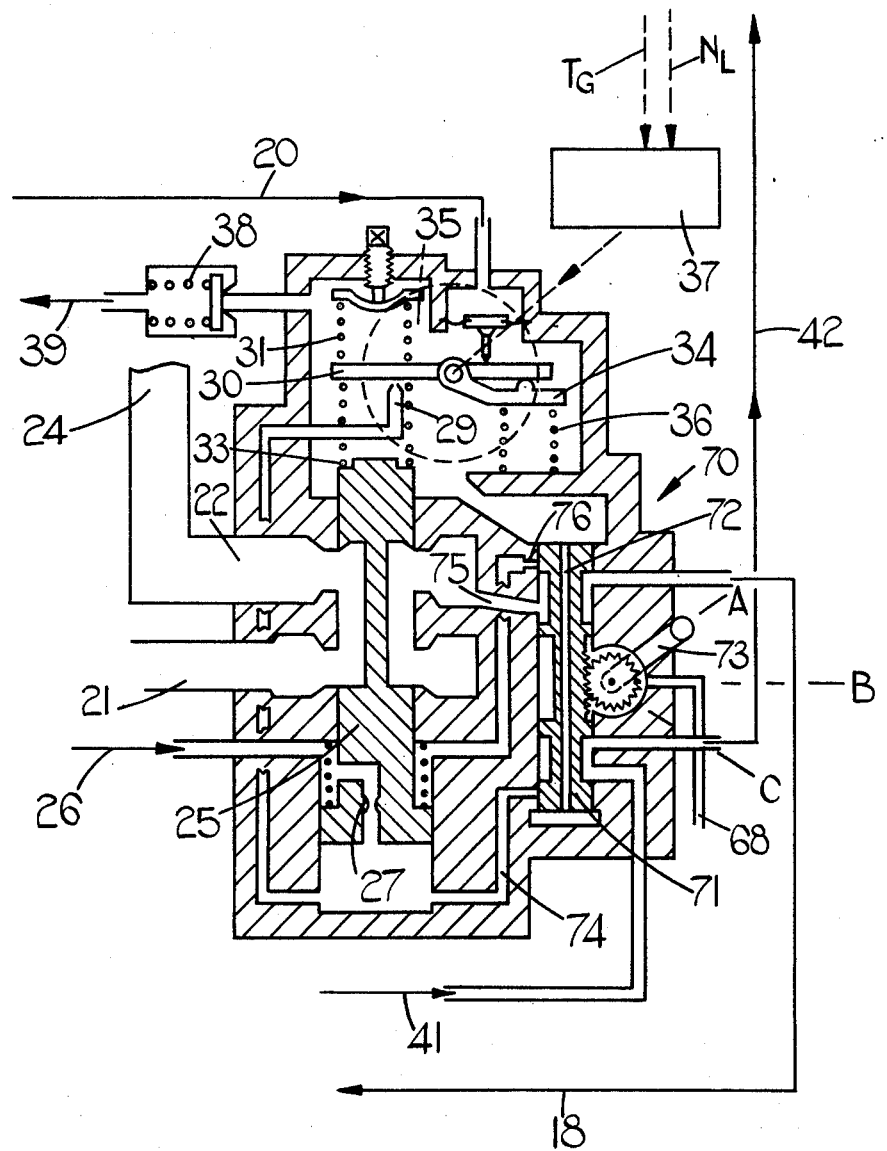

Examples of the invention will now be described with reference to the accompanying drawings, in which:

FIG. 1 shows a gas turbine engine fuel supply system incorporating a valve arrangement according to the invention, FIG. 2 shows an alternative form of shut-off valve, associated with the valve arrangement of FIG. 1, and FIG. 3 shows an alternative form of valve arrangement.

FIG. 1 shows a twin-spool gas turbine engine 10, that is an engine having two turbine and compressor arrangements, mounted on separate concentric shafts. A variable-stroke, positive displacement pump 11 is driven by the high-speed engine shaft to deliver fuel to a variable metering arrangement which includes a metering device 12. Device 12 is responsive to the position $\theta$ of an engine speed control lever, to the delivery pressures $P_2$, $P_3$ of the low speed and high speed compressors respectively, and to the speed $N_H$ of the engine high speed shaft. The variable metering arrangement includes a unit 13 downstream of device 12, and responsive to speed $N_H$ and to a pressure drop across metering device 12 to maintain this pressure drop substantially constant for a given engine speed. Unit 13 delivers fuel via a line 14 to a control valve 15.

The displacement of pump 11 is variable by means of a piston 16 which is biased towards a full stroke position by a spring 17. Piston 16 is urged against spring 17 by the delivery pressure from pump 11. Spring 17 is assisted by the pressure in a line 18, derived in a manner to be described.

A speed-responsive valve device 19 is driven by the engine high speed shaft to provide a first servo pressure signal on a line 20 to the valve 15. Valve 15 has an inlet 21 communicating with line 14, an outlet 22 communicating with the engine main burners via a shut-off valve 23 and line 24, and a spool control element 25. The pressure in outlet 22 is applied via line 18 to the piston 16 of the pump stroke control. Element 25 is movable to increase flow through outlet 22 in response to an increase in a second servo pressure signal derived from the outlet of pump 11 via a line 26 and a restrictor 27. Element 25 is biased against an increase in this second servo pressure signal by a spring 28.

The second servo pressure signal is controlled by a pilot valve arrangement having an orifice 29 and a closure member 30. Closure member 30 is movable against a spring 31, to open the pilot valve and reduce the second servo pressure signal, by a diaphragm actuator 32 responsive to the first servo pressure signal. A further spring 33 is engaged between control element 25 and closure member 30, so that movement of element 25 in response to an increase in the second servo pressure signal urges closure member 30 in a direction to reduce the second servo pressure signal.

Closure member 30 is also engageable by an arm 34 which is movable in a clockwise direction, as seen in the drawing, away from member 30, by a torque motor 35. Arm 34 is urged in an anti-clockwise direction, into engagement with closure member 30, by a spring 36. Torque motor 35 is responsive to an electrical control signal from a circuit 37 which is responsive to the speed $N_L$ of the low speed shaft of the engine, and to the temperature $T_G$ of the exhaust gases from the high speed turbine.

Fuel leaving nozzle 29 of the pilot valve is vented to low pressure via a non-return valve 38 and a line 39.

In use, it is arranged that the speed $N_H$ at which valve arrangement 15 operates to restrict fuel flow is higher than the maximum speed normally permitted by the variable metering arrangement 12, 13. Valve arrangement 15 thus acts as a back-up control to provide an emergency top-speed governor in the event of failure of metering arrangement 12, 13.

Valve arrangement 15 is also responsive to shaft speed $N_L$ and to temperature $T_G$ so that in the event of either of these parameters rising above acceptable limits, arm 34 is urged so as to reduce the force applied by spring 36, thereby reducing the speed $N_H$ at which valve 15 will operate to reduce fuel flow to the engine. In a limiting condition, if arm 34 is moved out of contact with arm 30, the effects of changes in the first servo pressure signal, i.e. changes in speed $N_H$, on the valve arrangement 15 are only 90% of their effects when arm 34 is in contact with closure member 30. Similarly, changes in speed $N_H$ have only 90% of their normal authority if the circuit 37 or torque motor 35 malfunction in such a way as to move arm 34 fully clockwise.

Shut-off valve 23 has a spool-type moving part 45 which is manually operable by means of a lever 40 movable between an open position (shown), a cold-start position B, and a shut position C. In position A valve 23 permits fuel flow from outlet 22 via line 24 to the engine main burners. It also permits fuel flow via a line 41 from the downstream side of variable metering device 12 to a line 42 which is connected to the engine pilot burners.

In the cold-start position B the downstream side of pump 11 is connected via line 26, restrictors 27, 43 and a bore 44, within the moving part 45 of valve 23, to the main burner line 24. Line 41 remains connected to line 42.

In the shut position C, outlet 22 of valve arrangement 15 is shut and a drain connection 46 is opened to allow fuel in lines 24 and 42 to escape to a drain.

FIG. 2 shows a valve arrangement 50 which is a modification of the valve arrangement 15 previously described, the connection lines to the remainder of the fuel control system being allocated the same reference numerals as the corresponding connection lines in FIG. 1.

The valve arrangement 50 includes a modified form of shut-off valve arrangement 51 which comprises three control elements 52, 53, 54 which are manually rotatable in unison between an open position A, a cold-start position B (shown), and a shut position C. Valve arrangement 51 has one group of three interconnected ports 55, 56, 57, a further group of three interconnected ports 58, 59, 60, and a pair of interconnected ports 61, 62. Elements 52, 53, 54 are movable to selectively uncover these ports and to shut-off or interconnect other connection lines in a manner to be described.

In the open position A of valve arrangement 51, ports 55, 57 are uncovered and interconnect valve outlet 22 with the servo line 18 to the piston 17, as before. Ports 61, 62 are uncovered and interconnect line 41 with the pilot burner supply line 42. The apparatus as a whole thus operates in the manner previously described.

In the cold-start position B (shown), outlet 22 and line 18 remain interconnected via ports 55, 57. The pump outlet line 26 communicates via a restrictor 63 and ports 60, 58 with the main burner supply line 24. Lines 41, 42 are interconnected via ports 61, 62 as in the open position A.

In the shut position C, the second servo pressure acting to maintain valve arrangement 50 open is connected, via a passage 64 and three further interconnected ports 65, 66, in shut-off valve 51 to the low pressure side of valve 38. Valve arrangement 50 thus shuts. A land 69 on control element 54 acts as a flow restrictor to prevent a violent drop in the second servo pressure. Outlet 22 is isolated from line 18. Lines 24 and 42 are connected to the drain connection 68, and lines 41 and 14 are also connected to the low pressure side of valve 38. Line 18 is also connected, via ports 65, 66, to the low pressure side of valve 38.

FIG. 3 shows a valve arrangement which is a further modification of the valve arrangement 15 of FIG. 1, similar parts being allocated identical reference numerals. The connection lines to the remainder of an associated fuel control system are also allocated the same reference numerals as the corresponding lines in FIG. 1.

The valve arrangement of FIG. 3 is distinguished from that of FIG. 1 by the provision of a spool-type pilot valve 70 which operates on the main valve servo pressure, thereby acting as a shut-off valve.

Valve 70 has a spool control element 71 which has an axial through bore 72 and which is manually movable by means of a lever 73 between an open position A (shown), a cold-start position B and a shut position C.

In position A valve 70 shuts off a passage 74 through which the second servo pressure would otherwise escape to a drain connection 68. Valve 70 also connects valve outlet 22, via a passage 75 with the servo line 18 to the piston 17. Line 41 is connected to the pilot burner supply line 42. Valve 25 thus acts to control fuel flow to the engine main burners, in response to the second servo pressure signal provided by the pilot valve arrangement 29, 30. The engine pilot burners are supplied directly from the downstream side of metering arrangement 12 and the displacement of pump 11 is responsive to the engine main burner fuel pressure.

In the cold-start position B the downstream side of pump 11 is connected via line 26, a restrictor 76, and passage 75 with the outlet 22 of valve 15. The engine pilot burners continue to be supplied from the downstream side of metering device 12 and the displacement of pump 11 is responsive to main burner fuel pressure, as in position A.

In the shut-off position C the second servo pressure acting to maintain valve arrangement 15 open is connected, via the passage 72 in control element 71, and via non-return valve 38 to the low pressure upstream of pump 11. Valve 15 thus shuts. Valve outlet 22 is connected, via passage 75, to the drain connection 68. Pilot burner supply passage 42 is also connected to the drain connection 68.

I claim:
1. A control valve arrangement for use in a gas turbine engine fuel supply system having a pump, a variable metering arrangement downstream of said pump and a device responsive to the speed of a turbine shaft of the engine to generate a first servo pressure signal dependent on said shaft speed, said valve arrangement comprising an inlet communicating with said metering arrangement, an outlet through which fuel can flow to said engine, a control element movable in response to an increase in a second servo pressure signal to permit an increased flow through said outlet, a pilot valve having a control member responsive to an increase in said first servo pressure signal to decrease said second servo pressure signal, means for biasing said pilot valve control member against said first servo pressure signal, and means, responsive to an increase in an engine operating parameter, for reducing the force applied to said pilot valve control member by said biasing means.

2. An arrangement as claimed in claim 1 in which said pilot valve comprises an orifice and an element responsive to said first servo pressure, in which said pilot valve control member comprises a lever member movable away from said orifice by said pressure-responsive element, and which includes a spring opposing movement of said lever member by said pressure responsive element.

3. An arrangement as claimed in claim 1 in which said means responsive to an engine operating parameter comprises a circuit responsive to said parameter to generate an electrical control signal, and an actuator responsive to said control signal for operating said pilot valve control member.

4. An arrangement as claimed in claim 3 in which said actuator comprises a torque motor.

5. An arrangement as claimed in claim 3 in which said actuator includes a lever arm engageable with said pilot valve control member and in which said biasing means urges said lever arm into engagement with said control member so as to cause the latter to shut said pilot valve, said lever arm being movable against its biasing means in reponse to an increase in said engine operating parameter.

6. An arrangement as claimed in claim 1 which includes a shut-off valve operable to reduce flow through said outlet.

7. An arrangement as claimed in claim 6 in which said shut-off valve includes first and second inlet ports for connection to first and second sources of pressurised fuel, a first outlet port communicating with said valve arrangement outlet, a second outlet port communicating with a low pressure drain, a third outlet port for connection to pilot burners on said engine, and a spool control member, said spool control member being movable between a first position in which said first inlet port and said third outlet port are interconnected, a second position in which said second inlet port and said first outlet port are also interconnected, and a third position in which said first, second and third outlet ports are interconnected.

8. An arrangement as claimed in claim 7 which includes a fluid flow restrictor in series with said second inlet port.

9. An arrangement as claimed in claim 7 in which said spool control member is operable, in said third position thereof, to bypass said pilot valve.

10. A fuel control system for a gas turbine engine, comprising a variable stroke, positive displacement pump, a variable metering arrangement downstream of said pump, a device responsive to the speed of a turbine shaft of the engine to generate a first servo pressure signal dependent on said shaft speed, and a valve arrangement comprising an inlet communicating with said metering arrangement, an outlet through which fuel can flow to said engine, a control element movable in response to an increase in a second servo pressure signal to permit an increased flow through said outlet, a pilot valve having a control member responsive to an increase in said first servo pressure signal to decrease said second servo pressure signal, means for biasing said pilot valve control member against said first servo pressure signal, and means responsive to an increase in said engine operating parameter for reducing the force applied to said pilot valve control member by said biasing means.

11. A system as claimed in claim 10 in which said metering arrangement includes a metering device responsive to a difference between desired and actual speeds of the engine to vary fuel flow to the engine, and means downstream of said device and responsive to engine speed and to the pressure drop across said metering device for maintaining said pressure drop substantially constant for a given engine speed.

12. A system as claimed in claim 11 in which said valve arrangement includes a shut-off valve having first and second inlet ports respectively connected to the outlet of said pump and to an outlet of said metering device, a first outlet port communicating with said valve arrangement outlet, a second outlet port communicating with a low pressure drain, a third outlet port for connection to pilot burners on the engine, and spool control member, said spool control member being movable between a first position in which said first inlet port and said third outlet port are interconnected, a second position in which said second inlet port and said first outlet port are also interconnected, and a third position in which said first, second and third outlet ports are interconnected.

13. A system as claimed in claim 12 which includes pump control means, responsive to an increase in fuel pressure at said valve arrangement outlet, for reducing the stroke of said pump.

14. A system as claimed in claim 13 in which said shut-off valve spool control member is operable, in said third position thereof, to isolate said valve arrangement outlet from said pump control means, and to connect said pump control means to a low pressure.

15. A system as claimed in claim 12 in which said shut-off valve spool control member is operable, in said third position thereof, to connect the outlet of said metering device and the inlet of said valve arrangement to a low pressure.

\* \* \* \* \*